United States Patent Office 2,894,773
Patented July 14, 1959

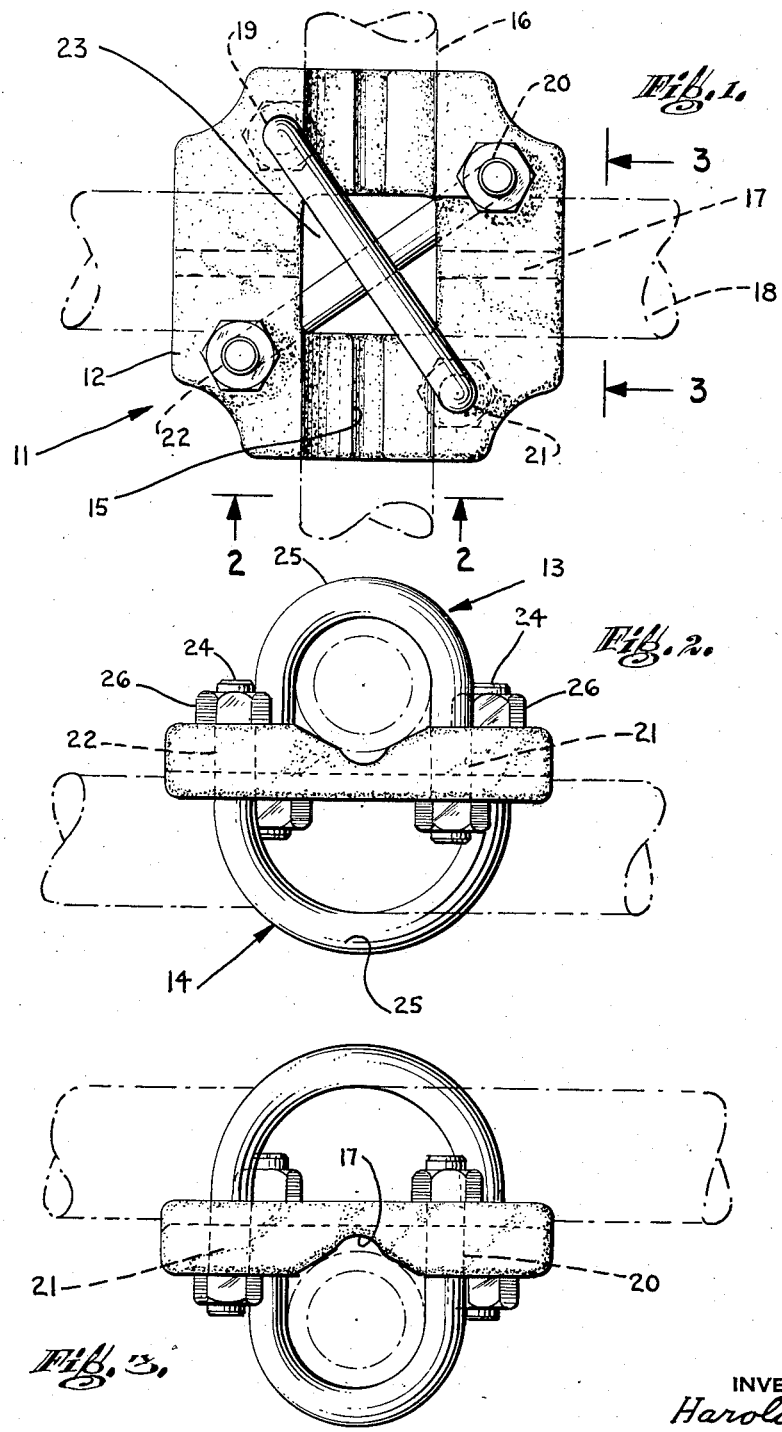

2,894,773

CLAMP

Harold C. Noe, Upper Montclair, N.J., assignor to Kidde Textile Machinery Corporation, a corporation of Delaware Application June 12, 1956, Serial No. 590,880

1 Claim. (Cl. 287—54)

The present invention relates to clamping devices, and, more particularly, to an improved clamp for securing a pair of crossed elements, such as rods or tubular members, adjacent their point of intersection.

In the textile industry the preparation of warps includes the withdrawal of yarn from individual packages and simultaneously winding as many as 5000 ends upon a beam. The rack or structure for supporting the yarn supply packages is called a creel and is generally composed of rod-like members arranged at right angles to each other in lattice form and having protuberances for receiving and supporting the packages in regular rows and columns. Such creels must be structurally sound and rigid to support the weight of the multitude of yarn packages.

Accordingly, an object of the present invention is to provide a clamp for firmly securing the members of a creel structure or the like.

Another object is to provide such a clamp which is particularly adapted for securing round members.

Another object is to provide such a clamp which does not have any sharp projections.

A further object is to provide such a clamp which may be easily and economically manufactured.

A still further object is to provide such clamps which facilitate rapid installation and dismantling of creel structure.

Other and further objects of the invention will be obvious upon an understanding of the illustrative embodiment about to be desribed, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Fig. 1 is a top view of a clamp in accordance with the present invention.

Fig. 2 is an elevational view of the clamp shown in Fig. 1 as seen along the line 2—2.

Fig. 3 is an elevational view of the clamp as seen along the line 3—3 on Fig. 1.

Referring to the drawing in detail, a clamp 11 is shown which generally comprises a plate 12, and a pair of U-bolts 13 and 14.

The plate 12 has means on the upper surface and on the lower surface for positioning a pair of crossed elements. As shown herein, the plate has an upper groove 15 for receiving a rod or pipe member 16, and has a lower groove 17 in intersecting relationship with the upper groove, preferably at right angles, for receiving a rod or pipe member 18. The members 16 and 18 are shown in broken lines, and may have any desired cross-sectional shape, for example, circular (as shown), elliptical or polygonal.

The plate further has four holes, 19, 20, 21 and 22 extending perpendicularly therethrough, each located between an adjacent end of the upper and lower grooves with the holes 19 and 21, and 20 and 22 being diagonally opposite, respectively. The four holes are so positioned that the centers of the holes define the corners of a square and the centers of one pair of diagonally opposite holes are in a plane intersecting the upper groove at an angle of less than forty-five degrees, the holes of that pair of diagonally opposite holes being closely adjacent the upper groove at opposite sides and adjacent opposite ends thereof and being further removed from the lower groove than the upper grooves. If desired, the central portion of the plate may be formed with a large hole 23 which reduces the weight and material cost of the plate without weakening the same or interfering with the function of the grooves 15 and 17.

The U-bolts 13 and 14 are identical in construction, and each includes a pair of threaded shanks 24 and an intermediate section 25 connecting the shanks which is shaped to conform to the outer contour of the members 16 and 18. The shanks of the U-bolt 13 extend downwardly through the holes 19 and 21, shanks of the U-bolt 14 extend upwardly through the holes 20 and 22, and nuts 26 are threaded onto the shanks to bear against the respective sides of the plate and cause the U-bolt sections 25 to embrace the members 16 and 18.

In the illustrative embodiment, the members 16 and 18 are circular in cross-section and the U-bolt sections 25 are elliptical along their inner edges and thus conform to a diagonal section of a cylinder which is elliptical in shape. The sections 25 thus respectively embrace one-half of the members 16 and 18 in a continuous line of contact therewith. Such engagement of the members 16 and 18 provides a secure connection which is not affected by vibrations, and avoids stress concentrations which might dent or otherwise mar the members 16 and 18 in the event they are relatively thin walled tubes.

In the event the members 16 and 18 have some other cross-sectional configuration the U-bolt sections 25 can be shaped accordingly to embrace the members in a continuous line of contact therewith.

While the present invention has been described in connection with a warping creel, it will be understood that the clamp can be utilized with other structures where it is desired to attach two tube or rod members disposed at an angle to each other.

From the foregoing description, it will be seen that the present invention provides an improved clamp which is simple and practical in construction and can be manufactured in an economical manner. The clamp is readily installed and taken apart, and can withstand such prolonged and rough usage to which it may normally be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

A clamp for securing a pair of crossed elements having a circular cross-section, the clamp comprising a plate having a pair of groove means each adapted for receiving one of the elements, one of said groove means extending across the upper surface of said plate and the other of said groove means extending across the lower surface of said plate at right angles to said upper groove means, said plate having a set of four holes extending perpendicularly therethrough and being positioned so that the centers of the holes define the corners of a square and the centers of one pair of diagonally opposite holes are in a plane intersecting said upper groove means at an angle of less than forty-five degrees, the holes of said pair of diagonally opposite holes being closely adjacent said upper groove means at opposite sides thereof and adjacent opposite ends thereof and being further removed from said lower groove means than from said upper groove means; first U-bolt means having parallel shanks extending through said pair of diagonally opposite holes from the upper surface; second U-bolt means having parallel shanks extending through the other pair of diagonally opposite holes from the lower surface; said U-bolt means having an intermediate elliptical section connecting the shanks thereof dimensioned from continuous engagement with elements having a circular cross-section; and means applied to the end of each of said shanks for causing said U-bolt means to hold the crossed elements on said plates.

References Cited in the file of this patent

UNITED STATES PATENTS

| | | |
|---|---|---|
| 792,065 | Myers | June 13, 1905 |
| 828,616 | Louden | Aug. 14, 1906 |
| 1,396,115 | Hotchner | Nov. 8, 1921 |
| 1,443,818 | Gillespie | Jan. 30, 1923 |
| 2,164,022 | Rowe | June 27, 1939 |

FOREIGN PATENTS

| | | |
|---|---|---|
| 968,226 | France | Apr. 12, 1950 |